Oct. 17, 1961

A. E. MOULTON 3,004,755

RUBBER SPRING SUSPENSIONS

Filed Dec. 4, 1959

ALEXANDER ERIC MOULTON
INVENTOR.

BY
Shoemaker and Mattare
ATTORNEYS

ALEXANDER ERIC MOULTON
INVENTOR.

BY
Shoemaker and Mattare
ATTORNEYS

United States Patent Office 3,004,755
Patented Oct. 17, 1961

3,004,755
RUBBER SPRING SUSPENSIONS
Alexander Eric Moulton, Bradford-on-Avon, England, assignor to Moulton Developments Limited, Bradford-on-Avon, England, a company of Great Britain
Filed Dec. 4, 1959, Ser. No. 857,334
3 Claims. (Cl. 267—21)

This invention relates to spring suspensions especially suitable for use in automobiles and other road vehicles.

In United States Patent No. 2,858,127 there is described a frusto-conical rubber-to-metal bonded sandwich or cone spring and the present invention provides improved arrangements of automobile vehicle spring suspension incorporating such cone springs.

Broadly stated an improved vehicle spring suspension according to the present invention comprises for each wheel a suspension arm pivotally mounted at one of its ends to the sprung structure by means of a high duty journal, the opposite end supporting the wheel, a sandwich spring comprising a frusto-conical body of rubber bonded to and between a pair of inner and outer sheet metal members, one of said sheet metal members being rigidly located with respect to said high duty journal by means including sheet metal substantially in tension, while the other of said metal sandwich members is associated by pivotal bearing means with the wheel suspension arm at such a distance from the high duty journal that the spring operates at a leverage of from four to six to one, and such that a deflection in the wheel on encountering a surface inequality produces a corresponding deflection in the sandwich spring and thereby relative movement of the sheet metal members, the relative movement of the said members being one quarter to one sixth of the corresponding wheel movement.

In the case of a suspension for a front wheel the wheel suspension arm above referred to will preferably be the upper arm of a conventional wishbone suspension linkage; while in the case of a rear wheel suspension the suspension arm may be a trailing arm pivotally mounted on the sprung structure at a point ahead of the wheel centre.

Preferably also, the single frusto-conical rubber sandwich spring has its outer metal member rigidly located by a sheet metal structure with respect to the high duty journal (which latter is preferably of the needle roller type) while its inner metal member is associated with the suspension arm by means of a tapered strut fabricated from sheet metal and whose larger end is welded to the inner metal member of the sandwich spring while its opposite end is pivotally connected to the suspension arm or to a crank associated therewith.

Preferably also at the lower end of the strut in the case of the front suspension, there is provided a high duty ball joint effecting the articulating connection between the wheel suspension arm and the unit which joint may incorporate a part-spherical steel ball working in a nylon seating.

The assembly is installed in a fabricated sheet metal box structure constructed economically in regard to use of material, the sheet metal walls of which take in tension the large separating loads between the top of the spring unit where it is attached to the vehicle, and the journal bearing of the wheel suspension arm on which the spring unit is bearing, the box structure, including the spring unit and wheel suspension arm, being advantageously prefabricated of light gauge material and assembled for installation in the vehicle. The journal bearing is advantageously of the needle roller type.

Reference will now be had to the accompanying drawings in which:

FIGURE 2 is a diagrammatic front view partly in section of a front wheel suspension including such spring while

FIGURES 4 and 5 are similar views to FIGURES 2 and 3 respectively but of a rear wheel suspension.

Figure 1:
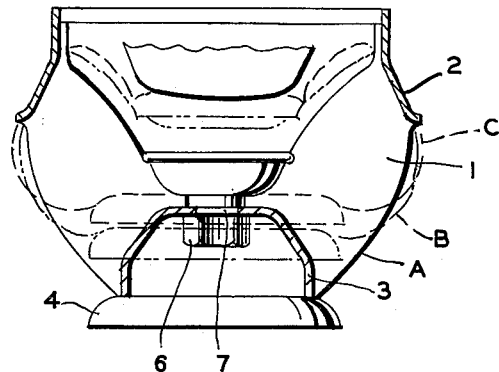
FIGURE 1 is a cross-sectional view of the frusto-conical rubber bonded to metal sandwich spring employed in the suspension system according to the invention.

Referring now to the drawings but first more particularly to FIGURE 1. The spring comprises a frusto-conical body of rubber 1 bonded to and between inner and outer sheet metal members designated 2 and 3 respectively.

The member 3 is formed with a flange 4 which serves to control the shape of the rubber body 1 when it is compressed. The full lines A in FIGURE 1 indicate the spring unit in its free position while the dotted lines B indicate its position when fitted to a vehicle and when the weight of the vehicle provides the necessary degree of preloading. The dotted lines C indicate the shape of the spring under full deflection, that is to say at the "full bump" position.

It will be understood that the spring undergoes mainly sheer deflection during the first part of its stroke but thereafter it is subject also to compression thereby ensuring that the spring has a rising rate which is a desirable characteristic when such a spring is employed in a vehicle wheel suspension.

Another advantage that this type of spring has, when so employed, is that due to the known characteristic of rubber, namely hysteresis, about 25% of the mechanical energy output of the spring during its stroke is dissipated by being converted into heat energy, this in turn endowing the spring with self-damping properties. Thus any rebound dampers or shock absorbers provided with a suspension employing these rubber springs will not be so heavily stressed as they would be if employed in conjunction with steel springs.

In order that the spring may be easily removed during repair or overhaul a nut 6 may be provided into which a bolt may be screwed through an aperture 7 such that the metal members 2 and 3 are drawn together thereby compressing the spring.

Figure 2:
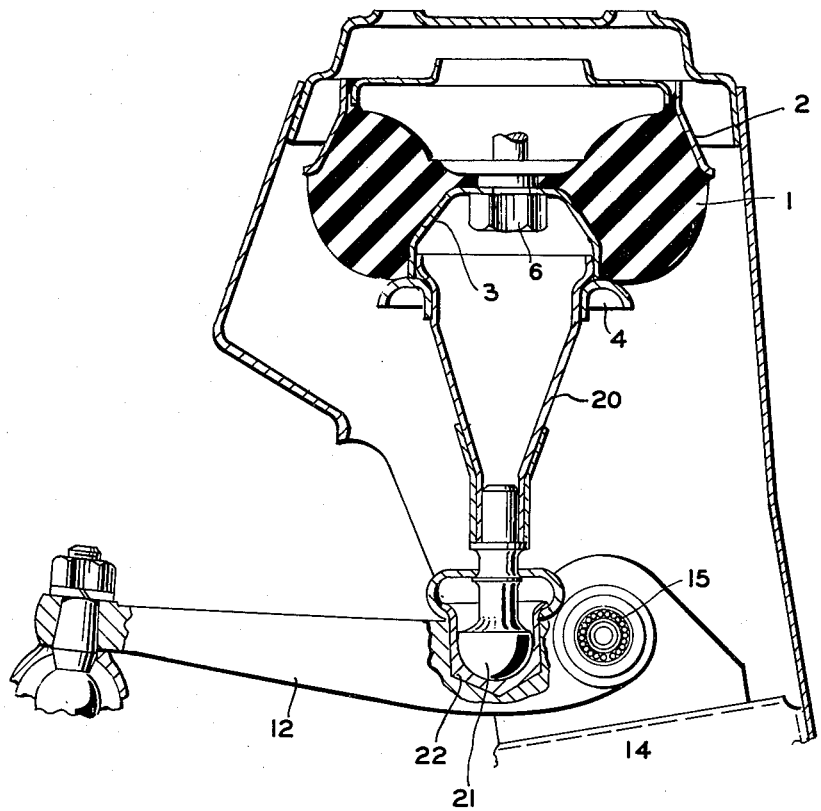
Figure 3:
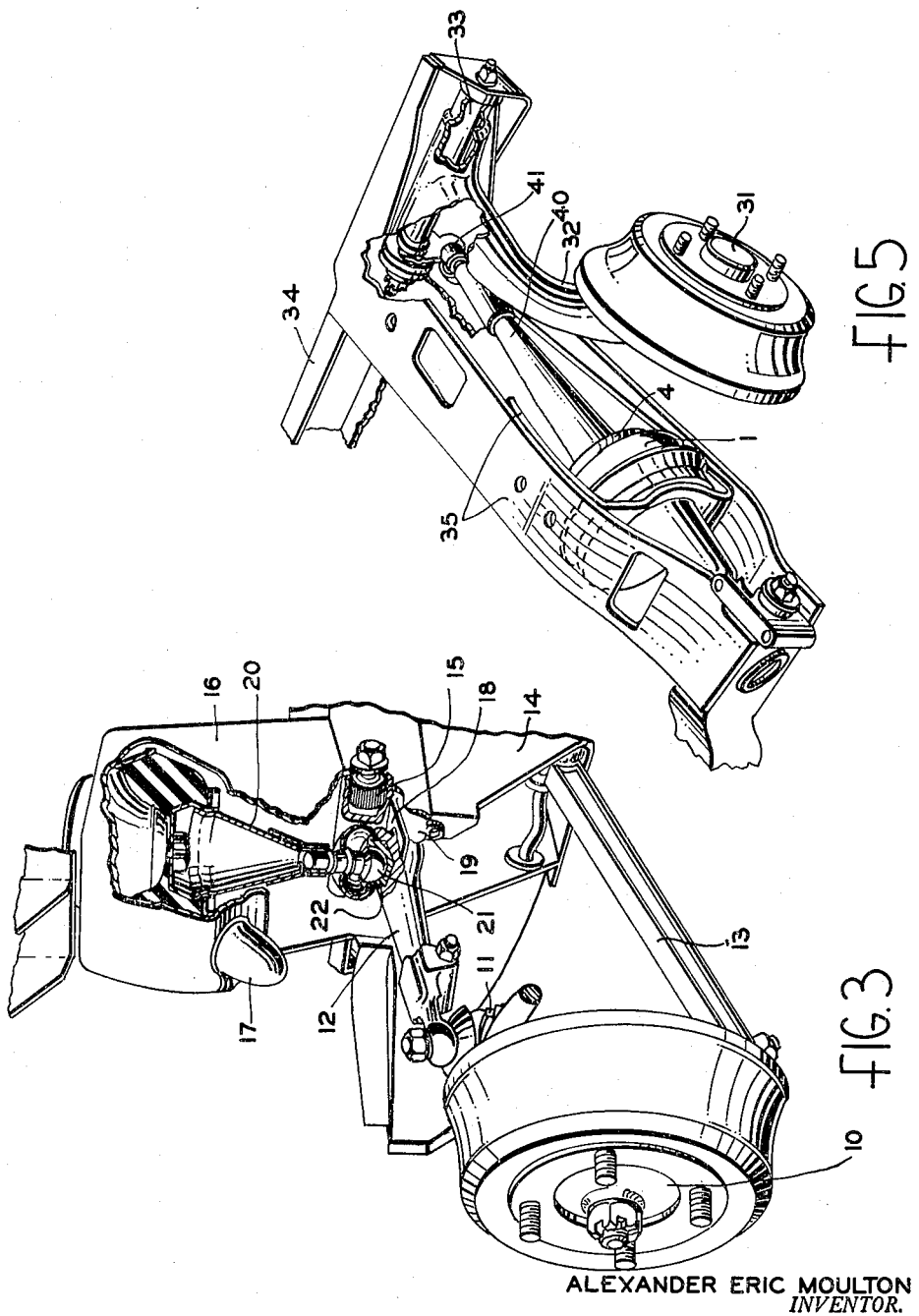
FIGURE 3 is a perspective view again partly in section of the arrangement illustrated in FIGURE 2.

Referring now to the front suspension system illustrated in FIGURES 2 and 3, the front wheel (not shown) is mounted on a hub 10 carried by a king pin generally designated 11 which latter is in turn carried through the medium of swivel mountings by unequal length upper and lower suspension arms 12 and 13 respectively pivotally mounted at their inner ends on the sprung structure of the vehicle generally designated 14, to form a conventional "wishbone" type suspension arrangement. The upper suspension arm 12 is shown in more detail in FIGURE 2 where it will be seen that its inner end is pivotally mounted on the sprung structure 14 by a high duty needle roller journal 15.

A spring as described in FIGURE 1 is mounted above the suspension arm 12 with its outer metal member 2 rigidly located with respect to the journal 15 by means of a sheet metal housing generally designated 16 whose walls are stressed substantially in tension especially during the working of the suspension. The housing 16 is rigidly attached to the sprung structure 14 by a simple welding operation.

Attached to the inner metal member 3 of the spring is a tapered strut 20 having at its lower end a ball 21 of a ball joint. The socket 22 of the ball joint is formed on the upper surface of the arm 12 at a distance from the journal 15 of about one fifth of the length of the arm 12. This arrangement ensures that when the wheel is deflected by one inch (or 1 cm.) during operation of the vehicle the strut 20 is deflected by one fifth of an inch (or .2 cm.) and the spring deflected accordingly.

The rubber spring therefore operates at a high loading since this allows a compact and efficient rubber spring arrangement.

Figure 4:
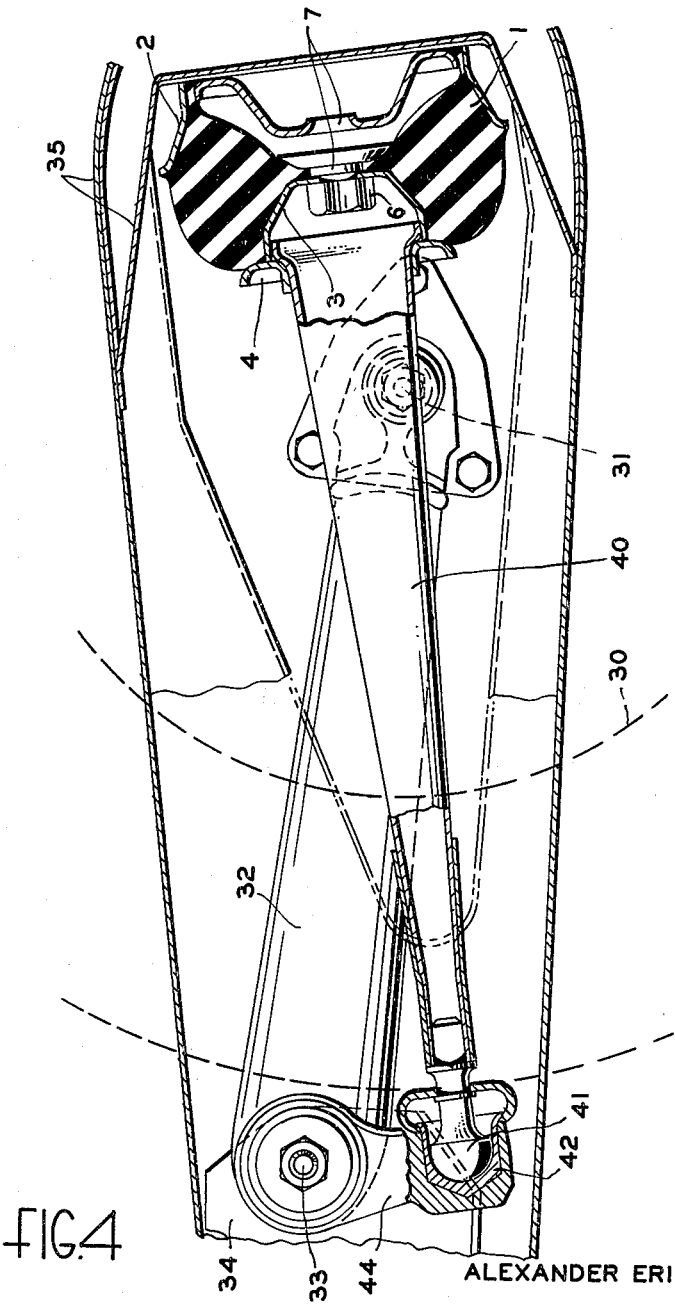

Referring now to FIGURES 4 and 5 where the rear wheel whose outline is shown by the dotted lines 30 in FIGURE 4 is mounted on a hub 31, which latter is in turn carried by a trailing suspension arm 32 pivotally mounted by a high duty journal generally designated 33, transversely of the vehicle, on a rear sub-frame 34 of the sprung structure. The rear wheel is thus enabled to swing about an arc which is in a vertical plane parallel to the vertical plane in which the longitudinal centre line of the vehicle occurs.

A frusto-conical rubber-bonded-to-metal sandwich spring as described with reference to FIGURE 1 has its outer metal member 2 rigidly located with respect to the journal 33 by means of sheet metal housing generally designated 35 whose walls are stressed substantially in tension during the working of the suspension. Such housing 35 in this embodiment forms an integral part of the rear sub-frame.

The inner metal member 3 of the spring is attached to one end of a tapered strut 40, which has at its opposite end a ball 41 of a ball joint. The socket 42 of the ball joint is formed on a crank 44 associated with the arm 32 the arrangement being such that radial movement of one inch (or 1 cm.) of the hub 31 during wheel deflection causes a corresponding deflection of the metal members 3 towards the member 2 of about one fifth of an inch (or .2 cm.). It may thus be said that the spring operates at a leverage of 1:5 with respect to the wheel.

In the wheel suspension arrangement stops limiting the radial movement of the suspension arms may be provided, for example at 17 and 18 in FIGURE 3, 17 being an upper limit stop formed by a body of rubber bonded to the box structure 16, while 18 is an abutment formed on the suspension arm 12 and arranged to abut against a rubber body 19 mounted on the sprung structure 14.

While the wheel suspension arrangements illustrated are of the fully independent kind, any known form of transverse stabilizing means such as anti-roll bars may be associated with the suspension means according to the invention.

It will be appreciated that the invention is not confined to the particular arrangements shown in the drawings.

By the present invention improved vehicle wheel spring suspensions are obtained in which the springs have a rising rate, that is to say their resistance to deformation increases with added load. The spring suspension is easily and economically manufactured while enabling vehicles fitted therewith to have a lower unsprung weight as compared with vehicles fitted with conventional steel spring suspension means. These and other advantages render the spring suspension system according to the invention epecially suitable for incorporation in light automobile vehicles.

What I claim is:

1. An individual wheel suspension for a vehicle, comprising a prefabricated sheet metal box-like structure adapted to be attached to the vehicle sprung structure and providing a mounting for a journal to which is connected one end of a wheel suspension arm, the other end of the arm carrying the wheel, said sheet metal box-like structure also providing a mounting for a rubber spring unit of general frusto-conical form being a solid of revolution generated from an inclined bonded rubber and metal sandwich of which the metal/rubber bonded interfaces are conical and the section of the rubber tapers from the inner interface towards the outer interface so that the mean stress on the inner bonded surface is substantially equal to the means stress on the outer bonded surface, and means connecting said arm to said spring unit so that upward deflections of the wheel in relation to the vehicle sprung structure produce and are resisted by corresponding but smaller deflections of said spring unit.

2. An individual wheel suspension system for a vehicle according to claim 1 wherein the metal member bonded to the outer interface of the rubber of the spring unit is connected to the sheet metal box-like structure on the vehicle sprung structure, while the metal member bonded to the inner interface of the rubber of the spring unit is connected to one end of a tapered hollow strut of sheet metal actuated by and pivotally associated with the wheel suspension arm.

3. An individual wheel suspension system for a vehicle according to claim 2, wherein the wheel suspension arm is a trailing arm and wherein the journal carrying it is mounted on the sheet metal box-like structure at a point ahead of the wheel centre, the axis of said journal lying substantially transversely of the vehicle, and wherein said suspension arm is formed with a crank lever which depends below said journal, and against which crank lever bears one end of the strut, the spring being located in rear of the journal such that the strut lies generally alongside the wheel with its axis substantially longitudinally of the vehicle.

References Cited in the file of this patent

UNITED STATES PATENTS

| | | |
|---|---|---|
| 1,689,883 | McComb | Oct. 30, 1928 |
| 1,965,447 | Bell et al. | July 3, 1934 |
| 2,128,694 | Dubonnet | Aug. 30, 1938 |
| 2,202,615 | Barenyi | May 28, 1940 |
| 2,260,634 | Mullner | Oct. 28, 1941 |
| 2,858,127 | Moulton | Oct. 28, 1958 |